J. P. Avery.
Garden Hoe.
Nº 112,627. Patented Mar. 14, 1871.
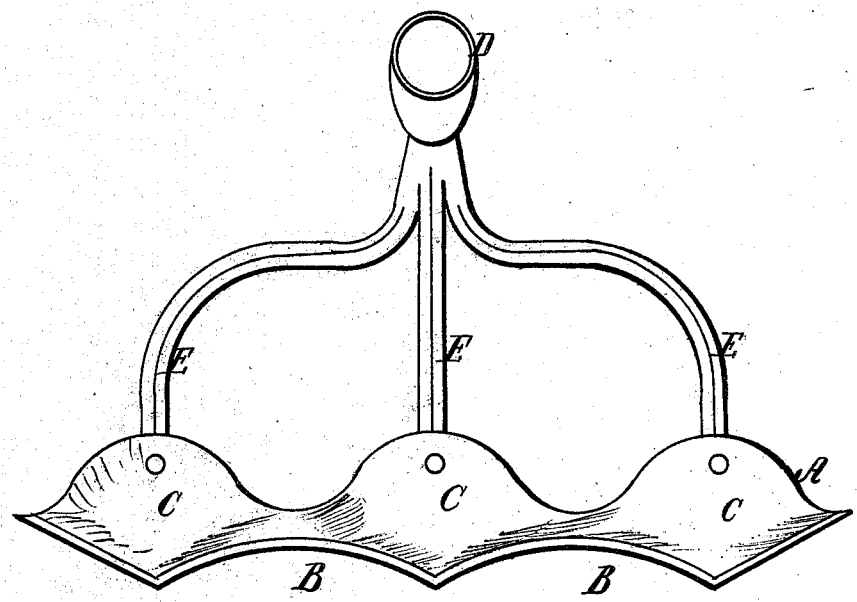
Witnesses:
A. F. Park
L. B. Rogers
Inventor:
John P. Avery

United States Patent Office.

JOHN P. AVERY, OF NORWICH, CONNECTICUT.

Letters Patent No. 112,527, dated March 14, 1871; antedated February 28, 1871.

IMPROVEMENT IN GARDEN-HOES.

The Schedule referred to in these Letters Patent and making part of the same.

I, JOHN P. AVERY, of Norwich, in the county of New London and State of Connecticut, have invented certain Improvements in Garden-Hoes, of which the following is a specification.

The nature of my invention consists in making the blade of the hoe narrow and attaching it transversely across the outer end of the curved forked shank of the hoe, so that the blade shall form a convenient angle with the handle.

The blade may be made of any length, according to the breadth of the hoe desired for use, and its outer edge is made with two or more concave curves or hollows, so as to form an angular cutting-edge.

The inner edge of the blade is attached to the forked shank, and is made with three or more corrugations or elevations on the front side, so that, when in use, it will slightly furrow or raise the earth between the elevations in the same manner as the ordinary rake.

The form of the shank of the hoe is immaterial, as it serves merely as a frame to hold the blade in the required position.

The object of my invention is to facilitate the means of thoroughly weeding and stirring the earth so that more ground can be cultivated, and with less manual labor.

In the accompanying drawing—

Figure 1 is a perspective view of my improved hoe.

A is the blade of the hoe, which should be made wide enough to give sufficient strength, and to receive the concave curves B and also the elevators C.

There are two or more concave curves B, made to cut the weeds or roots at an angle, and three or more elevations C, to loosen the earth and to throw it into slight furrows.

D is the shank of the hoe, curved and forked in the drawing into three branches, E, to hold the blade firm.

I claim as my invention—

A hoe, constructed as described, as a new article of manufacture.

JOHN P. AVERY.

Witnesses:
 WEBSTER PARK,
 JACOB B. ROGERS.